United States Patent
Walsh

(10) Patent No.: US 6,580,413 B1
(45) Date of Patent: Jun. 17, 2003

(54) METHOD AND APPARATUS FOR THE LOW COST FORMATION AND CONTROL OF IMAGES ON CONFORMAL MATERIALS

(75) Inventor: Shawn M. Walsh, Bel Camp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/574,470

(22) Filed: May 19, 2000

(51) Int. Cl.⁷ .................................................. G09G 3/38
(52) U.S. Cl. ........................ 345/105; 345/106; 345/107
(58) Field of Search ................................ 345/105, 106, 345/107

(56) References Cited

U.S. PATENT DOCUMENTS

| | | | | |
|---|---|---|---|---|
| 5,239,338 A | * | 8/1993 | Pearson et al. ................ | 355/32 |
| 5,698,774 A | * | 12/1997 | Osmanski ....................... | 73/61 |
| 6,362,807 B1 | * | 3/2002 | Baba et al. .................... | 345/107 |
| 6,369,793 B1 | * | 4/2002 | Parker ........................... | 345/107 |

* cited by examiner

Primary Examiner—Richard Hjerpe
Assistant Examiner—Jean Lesperance
(74) Attorney, Agent, or Firm—William W. Randolph; Paul S. Clohan, Jr.

(57) ABSTRACT

This invention provides a means for establishing and controlling a desired image on a material that is both conformal and flexible by nature. Such materials include paper, textiles, molded plastics, and woven fabric. The invention permits a low cost, effective means for generating both static and dynamic images on these materials while preserving the primary structural and functional attributes of the host material.

18 Claims, 4 Drawing Sheets

METHOD AND APPARATUS FOR THE LOW COST FORMATION AND CONTROL OF IMAGES ON CONFORMAL MATERIALS

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Discussion of Prior Art

There is an unmet need for a flexible, low cost display system as the vast majority of display materials rely on relatively expensive, technically complex systems to render an image. While there has been considerable innovation in the development of television technology (e.g., the cathode ray tube) many of these innovations have been confined to improvement in the performance of the electronics and materials needed to improve the quality of the generated images. The exception has been the development of "flat screen" technology, as well as liquid crystal (LCD) displays. Nevertheless these technologies all share a focus on the "high end" of the imaging spectrum. Other display technologies, such as mechanical-based "flip" signs (such as those found along highways and at construction sites) rely on a simpler but bulky technology to produce both static and dynamic images.

2. Advantages Over Prior Art

All known prior art related to thermochromic systems is basically restricted to very simple, passively based systems designed to indicate a change in response to an imposed stimulus. Furthermore, prior art in which the chromatic material is used in displays are typically constrained to relatively flat, well defined surfaces and geometries in compliance with standard administration, techniques, and protocols presently used to deliver information to the display unit. Power consumption, particularly in large area display systems, is yet another limitation apparent in the present art. The present invention provides a unique means for actively changing both the color and visual composition the chromic based materials by selectively distributing a relevant source of energy: selectively cooling or heating a textile material treated with chromic materials permits the generation and subsequent manipulation of a wide of variety of images.

The present invention permits the manufacture of distinctive media which can be used in a variety of critical and commercial applications. Texture, color, tone, and animation are all fundamental important elements in creating an effective display. The present invention provides a significant advantage over prior art inasmuch as it permits each of these elements to be adjusted for optimal effectiveness and transmission of the display information. Another advantage of the present invention is the ability to implement the invention using inexpensive input materials. Conventional printing processes, such as halftone printing and silk screening, are both 100% compatible with distributing the active display matrix onto or into the fibrous material.

The invention provides the further subjective advantage over the prior art of permitting a new aesthetic through which information and images can be communicated in an interesting and attractive way. The single most critical function of any display system is to attract the attention of the viewer and effectively communicate the desired information to the viewer. Given that the prior art generally consists of known means of displaying information (e.g., flat screen displays, monitors, digital signs, LED panels, printed posters and billboards) the present invention provides a means of displaying information in an unconventional way. The present invention provides a practical and economical means for realizing a host of new applications, including fabrics and reusable paperboard displays containing both static and animated manipulation of images and information.

SUMMARY OF THE INVENTION

Accordingly, it is an object of the present invention to provide a means for establishing and controlling a desired image on a material that is both conformal and flexible by nature.

The foregoing and other objects are achieved by an invention which enables the fabrication of a new generation of low cost, flexible, and highly novel display materials wherein images can be statically or dynamically rendered on a variety of non-traditional display materials. The invention enables a new means of conveying animated information and images without the use of considerably more costly, complex, and rigid devices such as liquid crystal displays, cathode ray tubes (CRTs), light emitting diode (LED) displays, and mechanically based display systems. The combination of low cost and material flexibility allows for the conception of a range of hitherto unavailable suite of technologies and products.

BRIEF DESCRIPTION OF THE DRAWINGS

The invention will be better understood, and further objects, features, and advantages thereof will become more apparent from the following description of the preferred embodiment, taken in conjunction with the accompanying drawings in which.

DETAILED DESCRIPTION OF THE PREFERRED EMBODIMENTS

Figure 1:
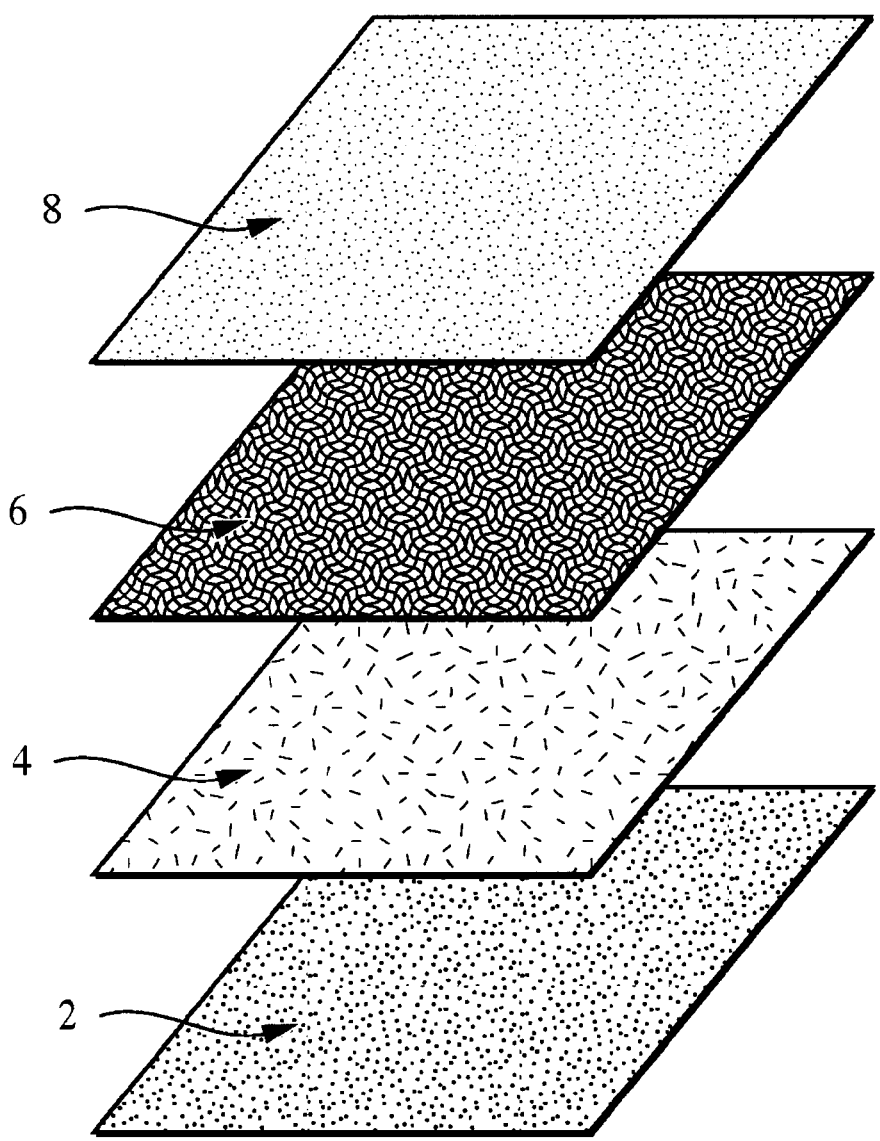
FIG. 1 illustrates the main components that constitute the present invention.

FIG. 1 illustrates the main components that constitute the present invention. As shown there, a sandwich construction is used to properly integrate fibrous substrate 2, energy distribution array layer 4, a fully stabilized chromatic layer 6, and protective-coating layer 8.

In the preferred embodiment fibrous substrate 2 can consist of any commodity material, including paper, cardboard, textile and composite fabrics, plastics, treated wood derivatives, natural films, and synthetic films. In essence, fibrous substrate 2 is the host material, such as posterboard for a display or fabric for articles of clothing.

Energy distribution array layer 4 contains the patterns to be generated in chromatic layer 6. In the preferred embodiment energy distribution array layer 4 is segmented so as to permit individual power distribution and control in each of the image elements; this permits both the formation of elements in a large image as well as the ability to animate or dynamically generate the image, if so desired.

Chromatic layer 6 consists of a coating which, by nature of its chemical and physical composition, shifts its color from one state to another in response to a prescribed amount of energy dissipated through it. In the preferred embodiment a thermochromic material is used in chromatic layer 6 which when exposed to a low-level heat source shifts from its base color to a transparent state. Selectively controlling the color properties creates a contrast which can be used to form the desired display information, image, or animation. It would be obvious to one skilled in the art that chromatic layer 6 could be comprised of either an electrochromic or thermo-chromic material. The thermal response time can be enhanced by selectively incorporating conductive particles into the chromatic material, thus aiding in thermal energy saturation and dissipation. Similarly, the invention allows for the selective cooling of the display media to accelerate the recovery of the thermochromic material to its original, unchanged state.

The invention provides for a means of binding the chromatic material in chromatic layer 6 to fibrous substrate 2, and furthermore, compatibility is ensured between substrate 2, binder, and thermochromatic material. The binder is, by nature of chemical composition, non-toxic, non-reactive, and may be subjected to repeated exposure to environmental conditions as well as laundering. The invention incorporates a series of coating specifically for reducing the fading effects of intense exposure to sunlight.

Figure 2:
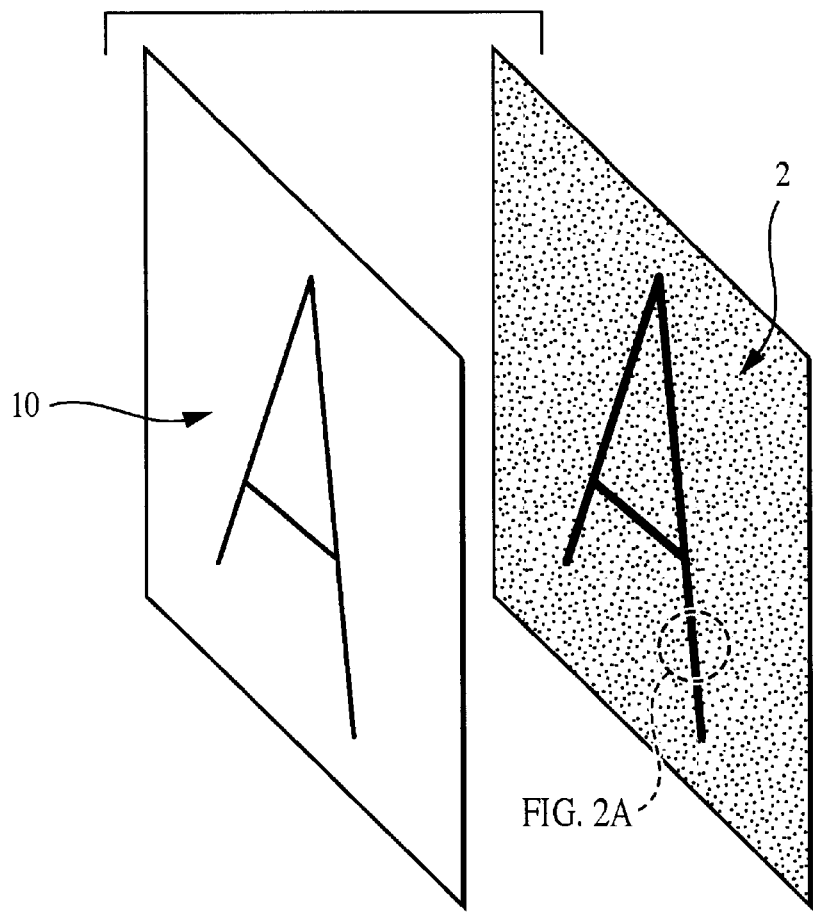
FIG. 2 demonstrates a means by which the display image itself may be formed.
Figure 2A:
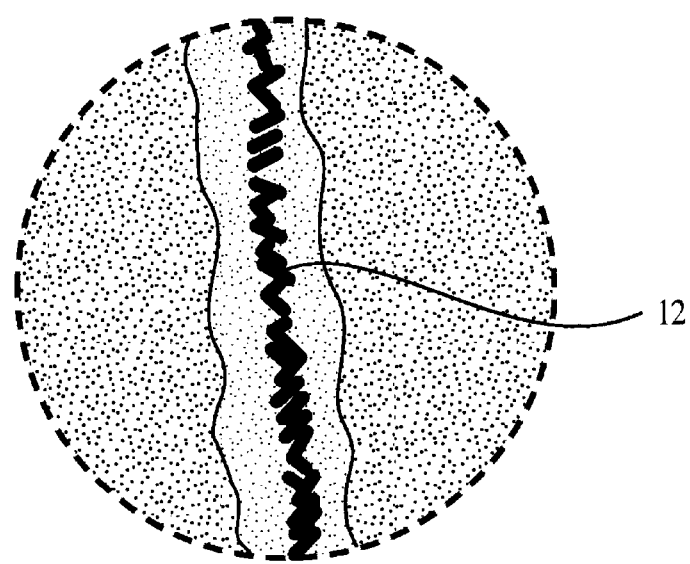
FIG. 2A illustrates an enlarged view of a portion of FIG. 2.

FIG. 2 demonstrates a means by which the display image itself may be formed. For example, if it is desirable to have the letter "A" appear when the invention is activated, one may incorporate the template for the letter "A" into the sandwich construction of printing screen 10 and fibrous substrate 2. Conventional printing screen technology may be used in order to substantially reduce the cost and complexity necessary to develop the templates in the fibrous substrate. As shown in FIG. 2A, the chromic material may be applied with the power element 12 properly embedded and affixed to fibrous substrate 2. The invention provides a means for establishing and controlling a threshold in response to shifting external conditions. In the preferred embodiment the thermochromatic material is essentially dormant below the threshold and active above the threshold. To enhance this performance a bimodal chromatic material may be incorporated in the invention; this may be used to shift color, tone, and image.

A protective coating or top layer 8 is provided in the invention to ensure the integrity and proper operation of the system despite exposure to reasonable levels of abrasion, wear, and wrinkling encountered during use.

Figure 3A:
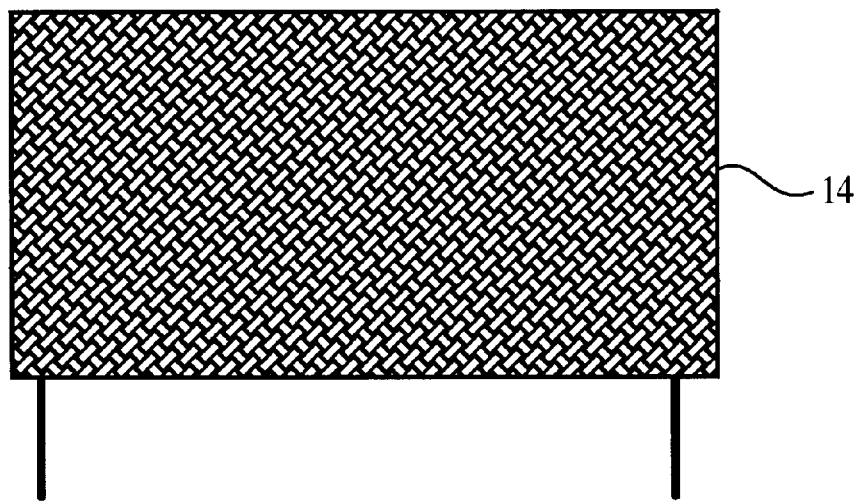
FIG. 3 provides a further example of how the present invention can be fabricated into a finished, working article.
Figure 3B:
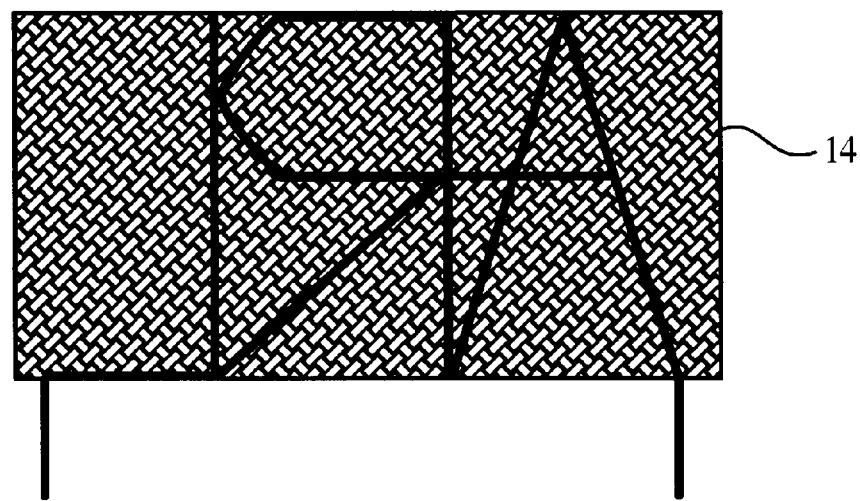

FIG. 3 provides a further example of how the present invention can be fabricated into a finished, working article. In this example the letters "ARL" have been selected purely for demonstration purposes. Fabric material 14 shown in FIG. 3 may be composed on cloth, paper, plastic, or an number of commercially available, flexible materials. Once the host material is selected it is either coated or impregnated with the thermochromic material. The textile or fibrous material may be impregnated with the thermo-chromic material. FIG. 3*a* illustrates the invention as it appears from the "front" (i.e., the side from which the viewer will observe it). Note the letters "ARL" are not visible or apparent because the invention has not been activated to render the letters. FIG. 3*b* illustrates how the letters are formed. In this application, the thermal heat source is a low cost wire which has been used to form the letters "ARL." Thermally applying the power causes the formation of the letters "ARL" on the host materials (i.e., fabric) itself.

Figure 4:
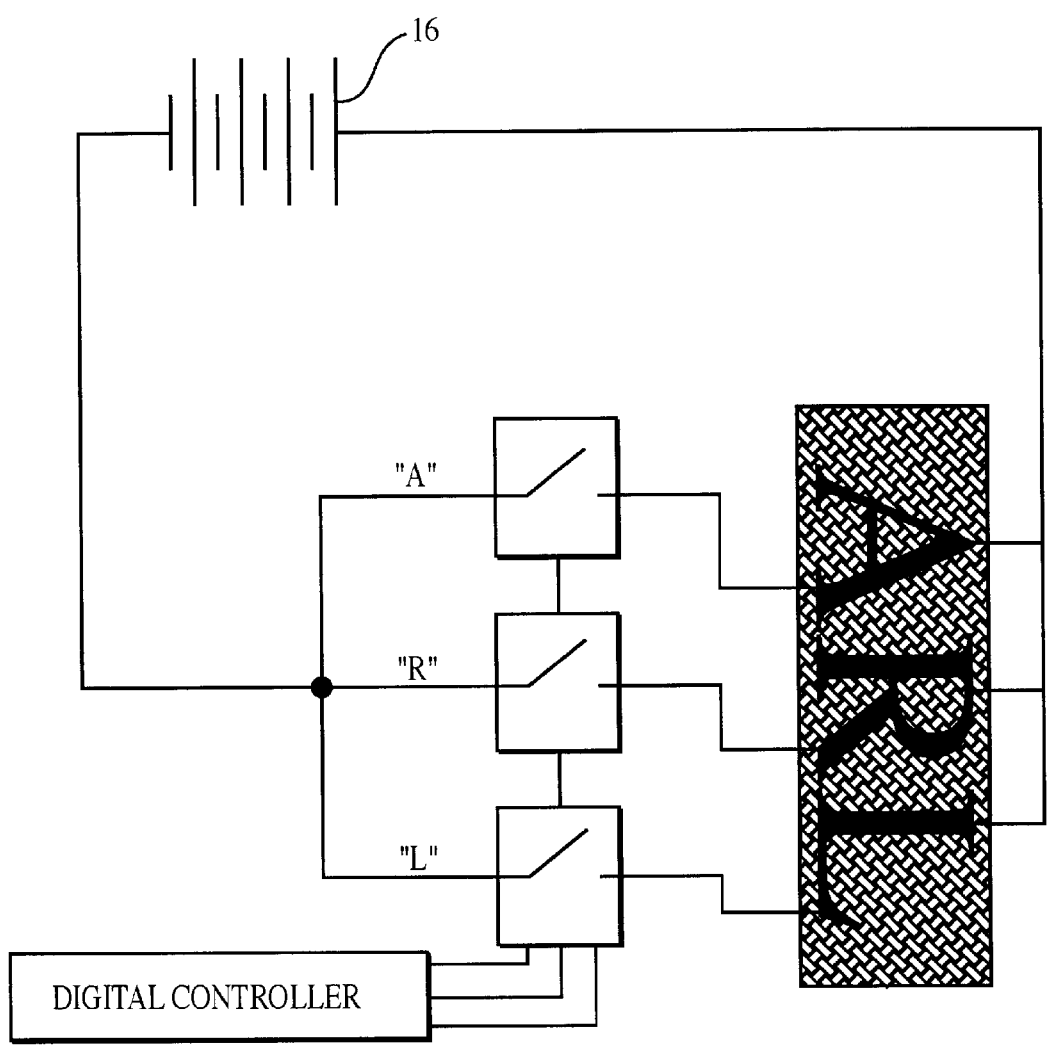
FIG. 4 illustrates an alternative means of rendering the invention so as to produce low level animation.

FIG. 4 illustrates an alternative embodiment of the invention so as to produce low level animation. In this case each of the letters a uniquely formed and connected individually to a control system. It would be obvious to someone in skilled in the art that the invention could be controlled either manually (through the uses of switches as shown in FIG. 4) or through micro-electronic controllers which perform the switching according to a programmed schedule, routine or sequence. FIG. 4 also demonstrates the preferred use of a low voltage direct current (d.c.) power source 16 which not only ensures the safety of the invention during use but also minimizes the cost and permits mobility of the system. Power source 16 is preferably lightweight, low profile, and has an interrupt feature to ensure safety in the event unacceptable temperatures are detected. Thus the invention may be further comprised of a means for measuring temperature to control the amount of heat dispersed to the images, and a micro-computer chip may be used to control the performance the invention. The micro-chip program can be augmented as necessary.

Finally, the invention provides a means for removing spent chromatic substrates and allows for the re-impregnation of the surface to restore the proper display characteristics. The invention also provides a means for achieving and sustaining a textile material that serves as a truly conformal display surface.

To demonstrate the invention, a blue colored thermochromatic material (supplied by Davis Liquid Crystal, California) was applied evenly over a 2"×5" piece of white stock paper. A 0.005" gage wire was used to from each of the letters and "L" and adhered to the back of the stock paper using a non-toxic cement-based glue; this is consistent with the description of the invention given in FIG. 3; a 1.5V direct current power source in series with a single push/single pull switch was connected to the two leads.

To operate the invention the switch was activated, which produced sufficient Ohmic (resistance) heating to shift the color of the thermochromic material from blue to the base stock paper color (white). This contrast effectively produces the letters "ARL". When the switch was turned off, the image faded completely, thus returning the material to its original state of appearance.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A flexible, conformal apparatus for the formation and control of images and which can be selectively conformed to different shapes, comprising:

a flexible, fibrous substrate layer;

an energy distribution layer connected to the substrate layer;

a chromatic layer connected to the energy distribution layer and comprising a coating which shifts from one color to another color in response to a prescribed amount of energy dissipated through the chromatic layer; and a protective coating layer connected to the chromatic layer;

wherein the energy distribution layer has a means for dissipating energy through the chromatic layer thereby generating a pattern on the chromatic layer.

2. The apparatus of claim 1, wherein the energy distribution layer comprises at least two separate segments and each segment having a separate energy distribution of a low level heat source for permitting the formation of a separate image for each segment.

3. The apparatus of claim 2, wherein the low-level heat source comprises wires connected to a DC power source.

4. The apparatus of claim 1, wherein the energy distribution layer comprises a low-level heat source.

5. The apparatus of claim 4, wherein the chromatic layer comprises a thermochromic material.

6. The apparatus of claim 5, further comprising conductive particles in the chromatic layer.

7. The apparatus of claim 4, wherein the low-level heat source comprises wires connected to a DC power source.

8. The apparatus of claim 1, wherein the fibrous substrate layer is formed of a woven material.

9. A flexible apparatus for the formation and control of images and which can be repeatedly conformed to different shapes, comprising:

a flexible, fibrous substrate layer;

an energy distribution layer which is connected to the substrate layer and which comprises a low-level heat source;

a chromatic layer which is connected to the energy distribution layer and which shifts from one color to another color in response to a prescribed amount of energy produced by the energy distribution layer and dissipated through the chromatic layer; and a protective coating layer connected to the chromatic layer.

10. The apparatus of claim 9 wherein the energy distribution layer comprises at least two separate segments and a separate energy distribution is provided for each segment, thereby permitting the formation of a separate image for each segment.

11. The apparatus of claim 9, herein the chromatic layer comprises a thermochromic material.

12. The apparatus of claim 9, further comprising conductive particles in the chromatic layer.

13. The apparatus of claim 9, wherein the low-level heat source comprises wires connected to a DC power source.

14. The apparatus of claim 9, wherein the fibrous substrate layer is formed of a woven material.

15. A flexible, conformal apparatus for the formation and control of images and which can be selectively conformed to different shapes, comprising:

a flexible, fibrous substrate layer;

a flexible energy distribution layer connected to the substrate layer, wherein the energy distribution layer comprises at least two separate segments and each segment having a separate energy distribution of a low level heat source for permitting the formation of a separate image for each segment;

a flexible chromatic layer connected to the energy distribution layer and comprising a coating of a thermochromic material which shifts from one color to another color in response to a prescribed amount of energy dissipated through the chromatic layer; and a coating means connected to the chromatic layer for protecting the chromatic layer;

wherein the energy distribution layer has a means for dissipating energy through the chromatic layer thereby generating a pattern on the chromatic layer.

16. The apparatus of claim 15, wherein the low-level heat source comprises wires connected to a DC power source.

17. The apparatus of claim 15, further comprising conductive particles in the chromatic layer.

18. The apparatus of claim 16, wherein the fibrous substrate layer is formed of a woven material.

* * * * *